United States Patent [19]

Harmon

[11] Patent Number: 5,080,282
[45] Date of Patent: Jan. 14, 1992

[54] AIR CONDITIONING APPARATUS

[76] Inventor: Kermit S. Harmon, 522 21st St. NW., Ste. 801, Washington, D.C. 20006

[21] Appl. No.: 568,997

[22] Filed: Aug. 17, 1990

[51] Int. Cl.⁵ ............................................. G05D 23/13
[52] U.S. Cl. ....................................... 236/13; 454/229; 454/236
[58] Field of Search ................. 236/13; 98/38.5, 38.6, 98/38.7, 38.9

[56] References Cited

U.S. PATENT DOCUMENTS

| | | | |
|---|---|---|---|
| 3,026,041 | 3/1962 | Jentoff | 98/38.5 X |
| 3,613,548 | 10/1971 | Motts et al. | 236/13 X |
| 3,951,205 | 4/1976 | Zilbermann | 98/38.7 X |
| 4,294,403 | 10/1981 | Ammons et al. | 236/13 |
| 4,328,926 | 5/1982 | Hall, Jr. | 236/13 |
| 4,352,453 | 10/1982 | McNabney | 236/13 |
| 4,605,160 | 8/1986 | Day | 236/13 |
| 4,657,178 | 4/1987 | Meckler | 236/13 |

Primary Examiner—William E. Tapolcai
Attorney, Agent, or Firm—Neal J. Mosely

[57] ABSTRACT

An air conditioning apparatus comprises an automatically controlled mixing box for an air conditioning system wherein a triple inlet mixing box has a cold air inlet, a hot air inlet, a return air inlet, and a fan for inducting and disbursing the air mixed therein. Thermostatic motors regulate the first and second dampers having a configuration which controls opening or closing of the hot air inlet, the return air inlet, and the cold air inlet in such a manner that the air mixture may be regulated from cold to neutral to hot without any direct mixture of the cold air and the hot air at any time. The fan draws in the air from the open or partially open inlet openings to mix the same and discharge the mixture to the room. Several fan-powered mixing boxes may be incorporated to create a multizone system with each zone regulated by a thermostat to mix the return air with hot or cold air to supply the desired zone temperature. In a dual inlet embodiment of the fan-powered mixing box, the return air duct is connected to the hot air duct outside the mixing box and a portion of the hot air duct serves as the inlet for both hot air and return air. Dampers are positioned within the return air duct and the hot air duct. Inside the mixing chamber, the open ends of the hot air duct and cold air duct are positioned to be opened and closed by a single damper controlling both the hot air inlet and cold air inlet without any direct mixture of the cold air and the hot air at any time.

31 Claims, 3 Drawing Sheets

TO ADDITIONAL FAN POWERED MIXING BOXES SERVING ADDITIONAL ZONES.

AIR CONDITIONING APPARATUS

BACKGROUND OF THE INVENTION

1. Field of the Invention

This invention relates to triple plenum air conditioning apparatus and more particularly to a triple-inlet, fan-powered, mixing box for use in single or multizone heating, ventilating, and air conditioning system.

2. Brief Description of the Prior Art

Triple plenum air conditioning apparatus which mix return air with hot or cold air are known in the art. The triple plenum systems were designed to reduce the energy consumption present in earlier systems. In earlier air conditioning systems for alternate heating and cooling, the heated air was mixed with the cooled air to provide a desired air temperature. This method was very wasteful of energy and generally unsatisfactory.

The most common triple plenum systems used in multizone systems comprise a central air handling unit wherein the central fan forces the air out at least two plenums at a time into the zone ducts. One plenum contains a heating device for providing warm or hot air and another contains a refrigerant evaporator coil or other device for providing cool or cold air and the third plenum simply neutral or return air. A return air duct, which may be an open return air space above the rooms in the building being heated or cooled, provides a plenum of ambient or neutral temperature air which is mixed with hot or cold air at the central air handling unit for disbursement through zone ducts.

A thermostat in the space controls an appropriate air flow damping system in the outlet ducts of the source in such a way that either heated air or cooled air or a mixture of one or the other with ambient air is delivered to the space. In order to conserve energy, it is necessary that air supplied to the space never be a mixture of heated air and cooled air. To this end, the duct for ambient air, generally referred to as bypass or return air, is usually interposed between the duct for heated air and the duct for cooled air and a damping system is required which will permit all heated air, a mixture of heated air with bypass air, all bypass air, a mixture of bypass air and cooled air, or all cooled air to be supplied to such space.

There are several patents which disclose triple plenum air conditioning apparatus for mixing hot or cold air with return air.

Wells, U.S. Pat. No. 3,847,210 discloses a rack and pinion damper sequencer for mixing bypass air with hot or cold air.

Perkins, U.S. Pat. No. 3,994,335 discloses a multizone air conditioning system which mixes recirculated air with hot or cold air. The system includes a single return air means for conducting the return air from the plurality of zones and a single shaft which operates a set of dampers to mix the return air with hot or cold air.

Timmerman, U.S. Pat. No. 4,164,976 discloses a damper assembly having interlocking members for interlocking adjacent damper assembly units together and adapted to be affixed to an air handling unit at an installation site. The damper assembly mixes ambient air with hot or cold air.

Ratner, U.S. Pat. No. 4,312,381 discloses an air flow damping system wherein a pair of spaced shafts each carrying a pair of planar damper blades are provided for mixing bypass air with hot or cold air. The hot air duct and the cold air duct each contain one damper blade and the bypass duct contains a first and second blade at right angles to each other. A control means is provided for maintaining both the first and second bypass blades in their fully open position and for rotating each shaft independently while maintaining the other stationary, to reciprocate one bypass blade between its fully open position and its fully closed position while reciprocating one of the hot air damper blade and cold air damper blade between its fully open and its fully closed position.

Gressett, U.S. Pat. No. 3,376,916 discloses a zone air conditioning apparatus utilizing a control or mixing box located between warm air and cold air inlet ducts and having a common outlet duct leading into a discharge which includes a fan on the downstream section. A circular baffle plate is disposed in the T-shaped section which serves to join the inlet ducts in coaxial relation. The baffle plate travels axially so as to traverse the opening of the common outlet duct to allow passage of warm air, cold air, or a mixture thereof to the zone being served.

Crombie et al, U.S. Pat. No. 3,911,953 discloses a triple plenum mixing damper having three planar blades in which the bypass air blade is fixed to a shaft and the other two are connected to the shaft by lost motion or overrunning spring couplings. The bypass blade is in the open position at the mid-point of shaft and the other blades are disposed at 45 degree angles relative thereto. In a first extreme position, the bypass blade extends 45 degrees across the bypass passage closing it off, the warm air blade extends parallel to the warm air passage opening it, and the cool air blade extends 45 degrees across the cool air passage closing it off. In a second extreme position, the bypass blade extends 45 degrees across the bypass passage closing it off, the warm air blade extends 45 degrees across the warm air passage closing it off, and the cold air blade extends parallel to the cold air passage opening it. In a third middle position, the bypass blade is parallel to the bypass passage opening it, and the warm air blade and cold air blade each extend 45 degrees across the warm air passage and the cold air passage, respectively, closing them off.

Marshall et al, U.S. Pat. No. 3,368,652 discloses a dual duct air distribution system adapted for seasonal change-over installation. Air flow is regulated by two different valves which operate in response to different actuating pneumatic pressures caused by a significant change in the pneumatic supply pressure which is provided within the building.

The prior art in general, and these patents in particular, do not disclose an air conditioning system including an automatically controlled triple inlet mixing box having a cold air inlet, a hot air inlet, a return air inlet, and a fan for inducting and disbursing the air mixed therein. Thermostatic motors regulate the rotation of first and second dampers having a configuration which controls opening or closing of the hot air inlet, the return air inlet, and the cold air inlet in a manner whereby the air mixture may be regulated from cold to neutral to hot. The cold air and the hot air are never mixed directly. The induction fan draws in the air from the open or partially open inlet openings to mix the same and discharge the mixture to the room. Several fan-powered mixing boxes may be incorporated into a multizone system with each zone regulated by a thermostat to mix the return air with hot or cold air to supply the desired zone temperature.

In a dual inlet embodiment of the fan-powered mixing box, the return air duct is connected to the hot air duct outside the mixing box and a portion of the hot air duct serves as the inlet for both hot air and return air. Dampers are positioned within the return air duct and the hot air duct. Inside the mixing chamber, the open ends of the hot air duct and cold air duct are positioned to be opened and closed by a single damper controlling both the hot air inlet and cold air inlet without any direct mixture of the cold air and the hot air at any time.

SUMMARY OF THE INVENTION

One object of this invention is to provide a fan-powered mixing box which reduces the energy required to raise or lower the temperature of air supplied to one or more zones.

Another object of this invention is to provide a fan-powered mixing box which delivers a predetermined air supply at variable temperatures to the zones to be conditioned.

Another object of this invention is to provide a fan-powered mixing box having sequentially coupled dampers which selectively mix return or neutral air with hot or cold air.

Another object of this invention is to provide a fan-powered mixing box having a damper system which will safely allow only neutral or cold air to be passed to the zone being conditioned in case of a system failure.

Another object of this invention is to provide a fan-powered mixing box suitable for use in either static pressure dependent or independent systems.

Another object of this invention is to provide an air conditioning apparatus in which there is a low energy requirement due to low total fan horsepower required; in which the central fan horsepower needs only to be sufficient to pump the air to the mixing boxes; and in which the central fan horsepower is further reduced as the fan-powered mixing boxes draw more neutral air and less hot or cold air.

A further object of the invention is to provide an air conditioning apparatus in which there is a low cost per zone since no additional zone ducts are required from central air handling unit as new zones are added; and in which cost is also low because all heating input is at the central air station rather than at terminal units as on terminal central unit systems.

A still further object of the invention is to provide an air conditioning apparatus in which smaller than conventional ducts may be used due to the ability of the system to operate efficiently with unusually cold and abnormally hot supply air temperatures without the problems generally attendant with such extreme supply air temperatures.

Other objects of the invention will become apparent from time to time throughout the specification and claims as hereinafter related.

The above noted objects and other objects of the invention are accomplished by an air conditioning apparatus which comprises an automatically controlled triple inlet mixing box for an air conditioning system having a cold air inlet, a hot air inlet, a return air inlet, and a fan for inducting and disbursing the air mixed therein. Thermostatic motors regulate the rotation of first and second dampers having a configuration which controls opening or closing of the hot air inlet, the return air inlet, and the cold air inlet. In this manner, the air mixture may be regulated from cold to neutral to hot. The cold air and the hot air are never mixed directly. The fan draws in the air from the open or partially open inlet openings to mix the same and discharge the mixture to the room. Several fan-powered mixing boxes may be incorporated into a multizone system with each zone regulated by a thermostat to mix the return air with hot or cold air to supply the desired zone temperature.

In a dual inlet embodiment of the fan-powered mixing box, the return air duct is connected to the hot air duct outside the mixing box and a portion of the hot air duct serves as the inlet for both hot air and return air. Dampers are positioned within the return air duct and the hot air duct. Inside the mixing chamber, the open ends of the hot air duct and cold air duct are positioned to be opened and closed by a single damper controlling both the hot air inlet and cold air inlet without any direct mixture of the cold air and the hot air at any time.

DESCRIPTION OF THE PREFERRED EMBODIMENT

Figure 1:
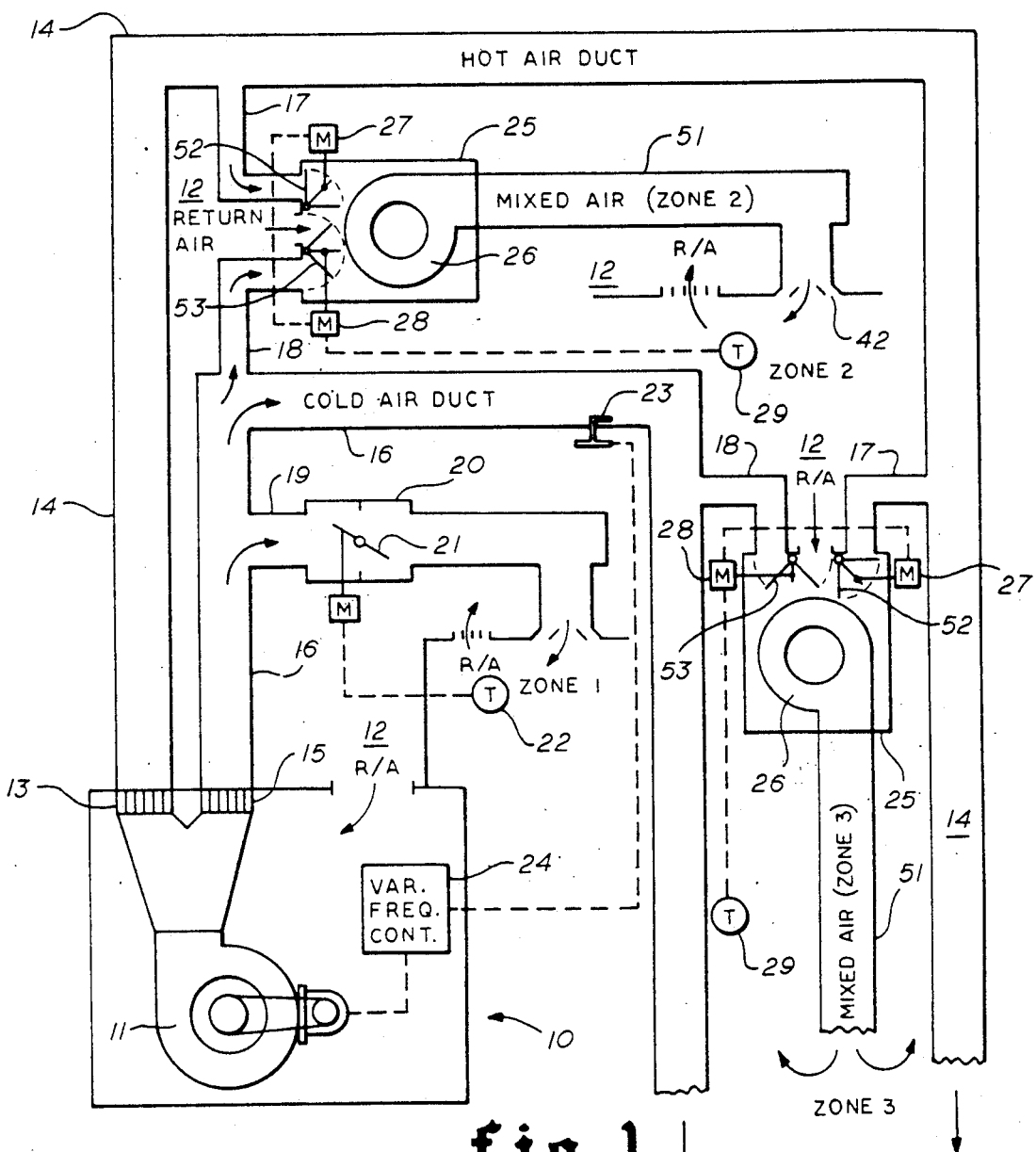
FIG. 1 is a schematic diagram of an air conditioning system in accordance with the present invention.

Referring to the drawings by numerals of reference, and more particularly to FIG. 1, there is shown an air conditioning system comprising a conventional central air handling unit 10 including a blower 11. Air handling unit 10 has an opening from a return air duct or plenum 12, and outlets to a hot air duct 14 and cold air duct 16. A heating coil 13 is positioned in hot air duct 14 for heating air supplied by blower 11. A cooling coil 15 is positioned in cold air duct 16 for cooling air supplied by blower 11. Ducts 14 and 16 supply hot and cold air to perimeter zone ducts branch 17 and 18 and cold air only to an interior zone branch ducts as 19. The cold air to the interior zone branch ducts as 19 supplies a variable air volume box 20 containing a damper 21 controlled by a thermostat 22 within the interior zone. There may exist a multiplicity of such variable air volume boxes serving interior zones.

A static pressure sensor 23 in the primary cooling duct 16 regulates the air pressure from blower 11. Optionally, some central air handling units may be provided with a variable frequency controller 24 between the static pressure sensor 23 and the blower 11. The variable frequency controller 24 proportionally reduces the speed of fan 11 in air handling unit 10 from either excessive pressure at static pressure sensor 23 or from excessive fan motor load sensed by the variable frequency controller 24. Controlling the supply air pressure in this manner allows the present invention to utilize either "pressure dependent" or "pressure independent" control systems.

Variable volume air handling fans are generally sized according to block load, a diversified load, rather than according to the total of peak zone loads. The variable volume air handling fans, when operated with pressure dependent controls systems (especially on fan-powered thermal units), tend to overload from abnormally low supply duct pressures This is often the case at the time of system start-up, when zone heating or cooling loads are far greater than the block load capacity of the air handling unit. After warm-up or cool-down, the zones are under steady-state control, the hot and cold dampers are partially closed to a modulated position, and the hot and cold air quantities from the air handling units are reduced, allowing the static pressure to build back up to a maximum pressure control mode. This maximum pressure or maximum fan load feature of the present invention allows the use of pressure dependent controls systems at significantly reduced initial cost and operating cost plus improved reliability from greater control system simplicity.

The perimeter zone hot air duct 17 and cold air duct 18 supply air to a fan-powered mixing box 25 in each of the one or more zones being heated and/or cooled. Mixing box 25 contains a fan 26 which induces and discharges a predetermined, preferably constant, air supply to the zone being conditioned (zone 2 or 3) through supply air diffusers 42. A pair of synchronized pneumatic damper motors 27 and 28 are controlled by a room or occupied space thermostat 29 in the zone being conditioned (zone 2 and 3). Damper motor 27 regulates rotation of a damper 52 opening or closing the return air opening from duct or plenum 12. Damper motor 28 regulates rotation of a damper 53 opening or closing the return air opening from duct or plenum 12. By coordinated operation of the damper motors 27 and 28 the temperature of the air being delivered is continuously variable from hot air, through mixtures of hot air and return air, to all return air, through mixtures of return air and cold air, to all cold air.

Figure 2:
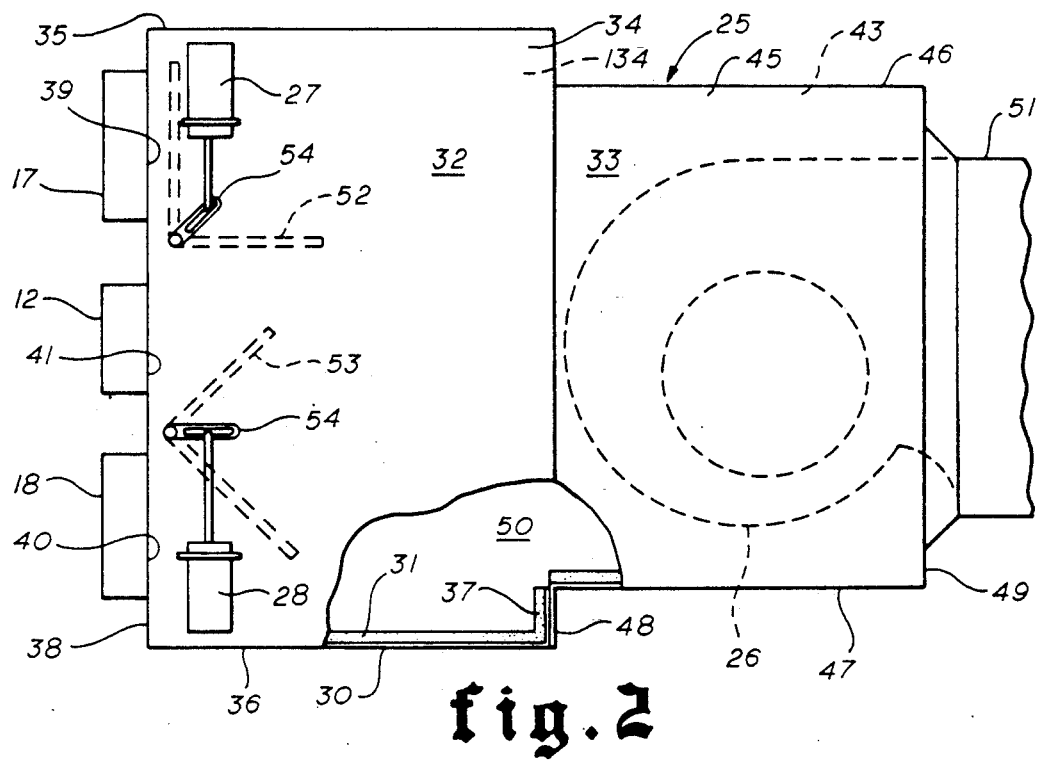
FIG. 2 is a top plan view of a preferred fan-powered, mixing box.

In FIGS. 1 and 2, the fan-powered mixing box 25 may be provided with conventional access panels, electrical knock outs, flow measuring taps, and thermostat connections (not shown). Mixing box 25 is constructed of sheet metal 30 having an interior lining of thermal and acoustic insulating material 31. Mixing box 25 has a mixing chamber 32 and an adjoining fan chamber 33 with an opening 50 therebetween. Mixing chamber 32 has a top wall 35, a bottom wall 36, side walls 34 and 134, a front end wall 37, and a generally open rear end wall 38. The rear end wall 38 has a hot air inlet 39, a cold air inlet 40, and a neutral or return air (ambient air temperature) inlet 41. Hot air inlet 39 is connected to a hot air supply duct 17. Cold air inlet 40 is connected to a cold air supply duct 18. Return air inlet 41 is connected to return air duct or plenum 12 carrying return air flowing back to the air handling unit 10. The return air conductor which may be a return air duct common to all zones or an open space above the rooms being heated or cooled which comprises a return air plenum.

The fan chamber 33 has top wall 46, a bottom wall 47, side walls 45, a generally open rear end wall 48, and a front wall 49. Rear end wall 48 adjoins the front end wall 37 of the mixing chamber 32 to define an open passageway 50 therebetween. The front end wall 49 is connected to a zone supply duct 51 leading to an air diffuser 42 or the like. A constant volume fan 26 is disposed within the fan chamber 33 to pull or induce the hot air, cool air, or return air through the inlets 39, 40, and 41.

A pair of pneumatic damper motors 27 and 28 are controlled by a remote zone thermostat 29 to regulate dampers 52 and 53 controlling inlets 39, 40 and 41 in the mixing chamber 32. The damper motors 27 and 28 are attached to mixing chamber 32 at a suitable location such as the side wall 34 and connected to dampers 52 and 53 by conventional adjustable linkage mechanisms 54. Damper motors 27 and 28 are coordinated in their action to sequence the movement of dampers 52 and 53 to regulate the flow and mixing of hot air, cold air and return air for controlling the air temperature delivered to the space being heated or cooled to a final preselected or predetermined temperature.

It should be noted that the zone thermostat 29 responds to room air temperature and not supply air temperature. Supply air temperature will vary widely as required to bring the temperature of the space being heated or cooled under control.

The location of the inlets 39, 40, and 41 are not limited to those shown in the drawings and it should be understood that various other equivalent inlets, damper motors, and damper blade constructions may be incorporated to meet the demands of efficiency or size and space requirements without departing from the scope of the present invention. As an example any conventional damper could be located solely in each of the hot, cold, and neutral inlets 39, 40, and 41 and sequenced according to this invention and achieve similar results.

Figure 3:
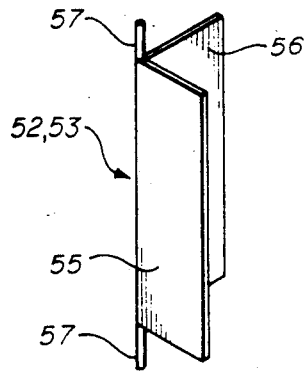
FIG. 3 is an isometric view of a damper member of the fan-powered, mixing box shown in FIG. 2.

In FIG. 3, the dampers 52 and 53 are illustrated as having a dihedral construction comprising a pair of flat blades 55 and 56 provided with mounting pins 57 at the top and bottom The blades 55 and 56 are connected to form a dihedral angle of a size such that rotary movement will allow one blade to open or close the hot or cold inlet while the other blade simultaneously opens or closes the return air inlet. A simple damper construction is possible because the triple-inlet, fan-powered mixing box depends upon air induction in contrast to prior art devices which depend on air displacement and require more complex damper designs.

Figure 4A:
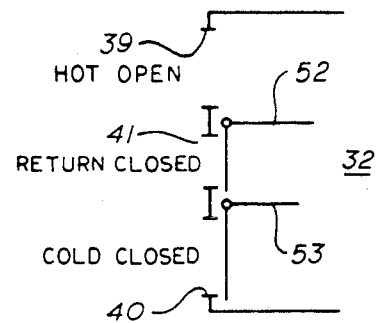
FIGS. 4A through 4E are schematic drawings illustrating the position of the damper members in various heating and cooling modes.
Figure 4B:
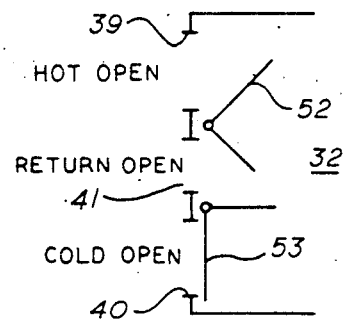
Figure 4C:
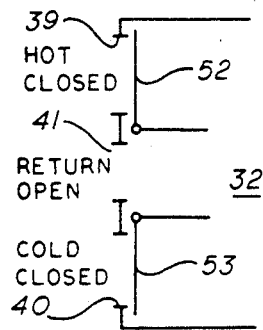

Referring now to FIGS. 4A through 4E, the position of the dampers 52 and 53 are shown in various heating and cooling modes. In FIG. 4A, the return air inlet 41 and the cold air inlet 40 are closed to allow only hot air to enter the mixing chamber 32. In FIG. 4B, the return air inlet 41 and the hot air inlet 39 are open and the cold air inlet 40 is closed to allow a mixture of return air and hot air to enter the mixing chamber 32. FIG. 4C shows the hot air inlet 39 and the cold air inlet 40 closed, and the return inlet 41 open to allow only return air to enter the mixing chamber 32.

Figure 4D:
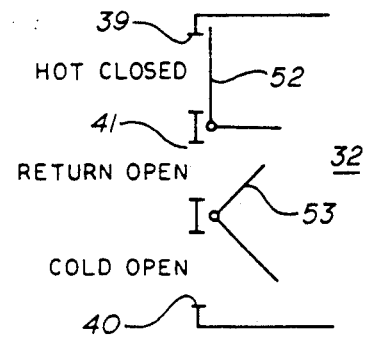
Figure 4E:
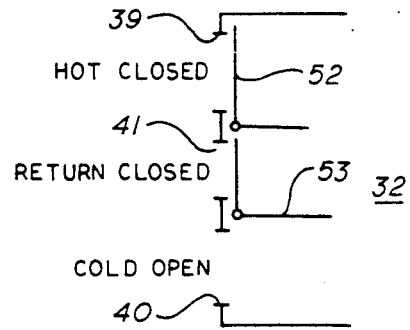

In FIG. 4D, the return air inlet 41 and the cold air inlet 40 are open and the hot air inlet 39 is closed to allow a mixture of return air and cold air to enter the mixing chamber 32. In FIG. 4E, the return air inlet 41 and the hot air inlet 39 are closed and the cold air inlet 40 is open to allow only cold air to enter the mixing chamber 32. In this manner, the air mixture may be graduated from cold to hot without ever mixing the cold air and the hot air directly.

Figure 5:
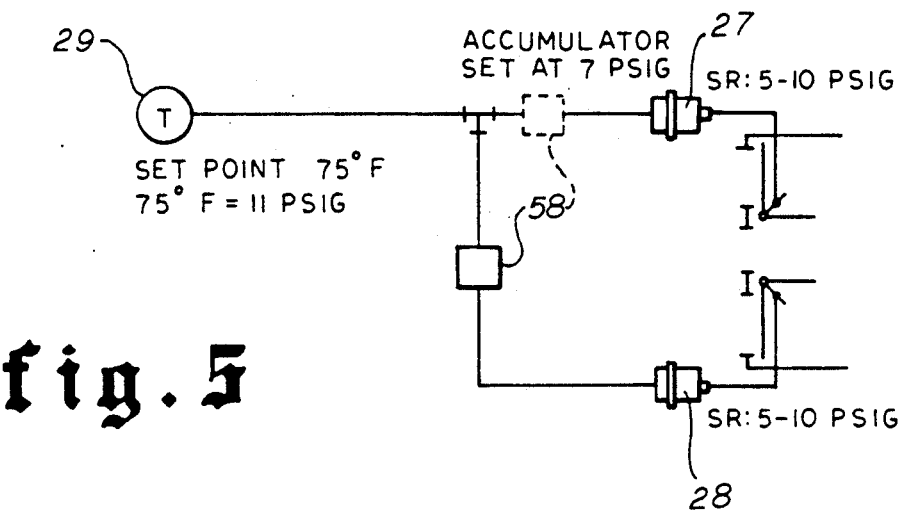
FIG. 5 is a schematic diagram of the pneumatic damper control system.

FIG. 5 illustrates the pneumatic damper control system diagrammatically. The system comprises a direct acting zone thermostat 29 which controls the operation of hot air damper motor 27 and cold air damper motor 28. The hot air damper motor 27 and cold air damper motor 28 have an effective spring range to be operational from 5 to 10 psig (pounds per square inch gauge). The cold air damper motor 28 is fed through accumulator 58 set at 7 psig to modify the effective spring range to be operational from 12 to 17 psig. Accumulator 58 may be installed in the line between the thermostat 29 and hot air damper motor 27 in lieu as shown and thermostat 29 changed to reverse acting and damper motor spring return actions reversed so that in the event of a control system failure such as loss of pneumatic pressure, the dampers will automatically, by spring power, return to a position closing the hot air inlet 39 and return air inlet 41 which allows only cold air to be circulated. It can be noted that selecting a pneumatic motor which has a spring range of 12-17 psig allows deletion of the accumulator.

Figure 6:
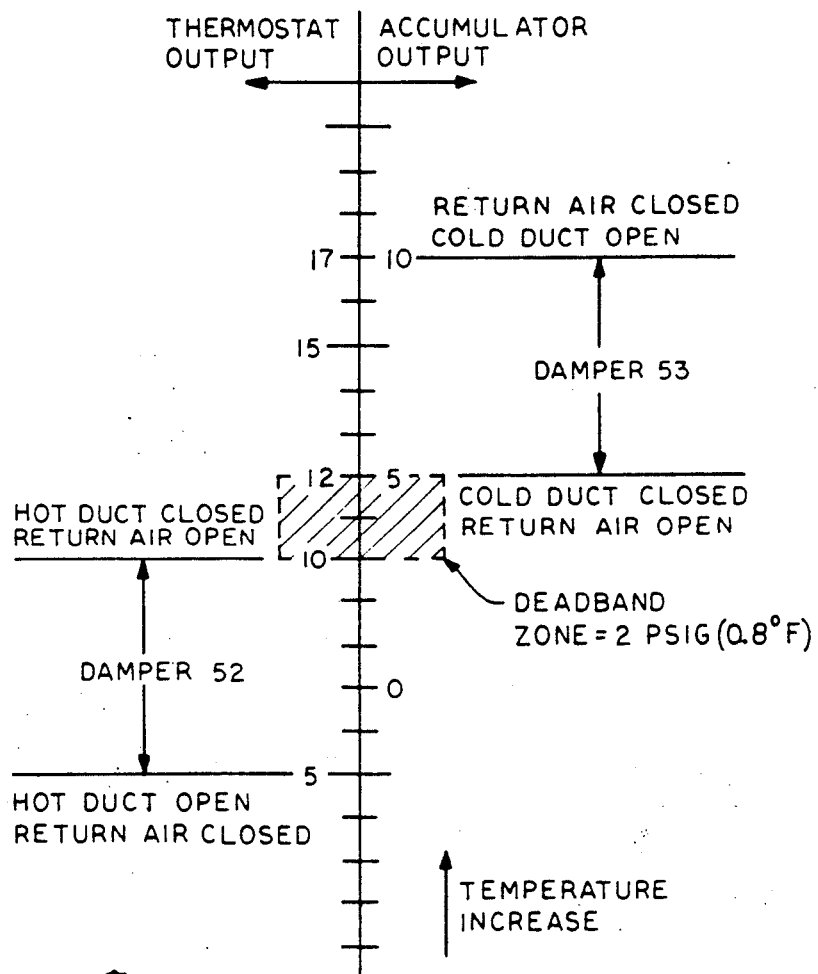
FIG. 6 is a graph illustrating the operation of the damper system of the present invention.

FIG. 6 is a graph of the sequence of operation of the pneumatic damper control system. The vertical line has divisions thereon representing psig. The thermostat 29 output which pneumatically controls the damper operation is represented on the left side of the line and the accumulator 58 output on the right side. Zone thermostat 29, is calibrated so that a room air temperature of 75 degrees F. is equivalent to 11 psig. The calibrations of damper linkage and accumulator 58 are made so that from 5 to 10 psig the warm air damper 52 is operational, and from 12 to 17 psig the cool air damper 53 is operational. The range from 10 to 12 psig is a deadband zone (equivalent to eight-tenths of a degree F.) where that neither damper is operational, but dampers remain in a position such that only return air is recirculated.

Figure 7:
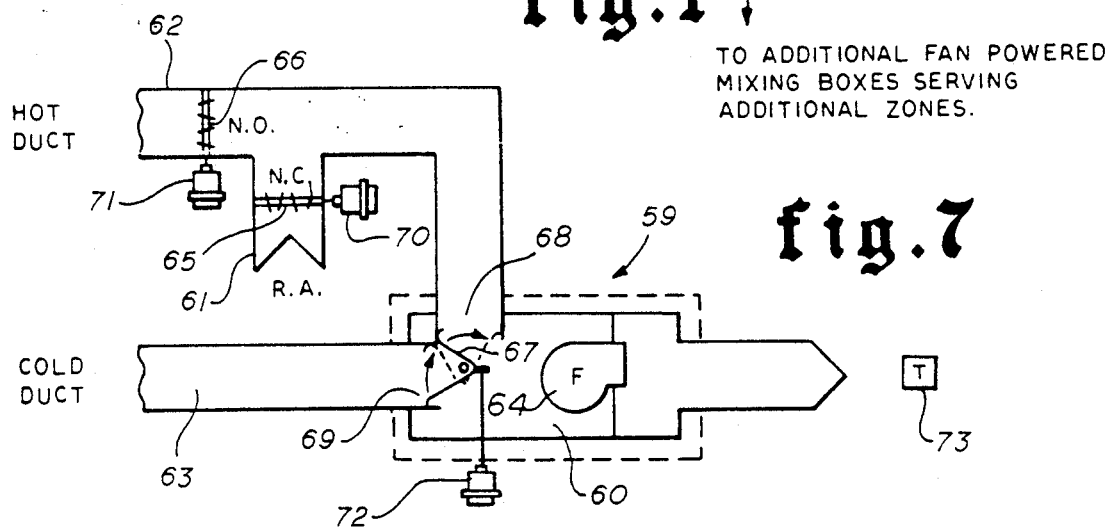
FIG. 7 is a schematic drawing of an alternate embodiment of a fan-powered mixing box.

In FIG. 7, there is a schematic illustration of an alternate embodiment of a fan-powered mixing box 59 utilizing a dual inlet mixing chamber 60. In this embodiment, a neutral or return air duct 61 is connected to hot air supply duct 62 outside the mixing box 59. Hot air duct 62 and the cold air duct 63 are connected to the mixing chamber 60 which contains a constant volume fan 64. Dampers 65 and 66 are positioned within the return air duct 61 and hot air duct 62. Inside the mixing chamber 60, the open ends of hot air duct 62 and cold air duct 63 are positioned perpendicularly and a single damper 67 is rotationally disposed within the mixing chamber 60 adjacent to and controlling both the hot air inlet 68 and cold air inlet 69.

The damper 67 has a dihedral construction comprising a pair of flat blades provided with suitable mounting pins at the top and bottom. The blades have a dihedral angle of a size such that cold air inlet 69 is blocked in the normally closed position while the hot air inlet 68 is open and rotary movement of the blades in the direction of the arrows gradually opens the cold air inlet 69 and simultaneously closes the hot air inlet 68 as indicated in dotted line. As illustrated in FIG. 7, when the hot air inlet 68 is open and the cold air inlet 69 is closed, the lower blade of the damper 67 is engaged on the lower lip of the cold air duct 63 and the upper blade is engaged on the left hand lip of the hot air duct 62. When the hot air inlet 68 is closed and the cold air inlet 69 is open, the lower blade of the damper 67 is engaged on the upper lip of the cold air duct 63 and the upper blade is engaged on the right hand lip of the hot air duct 62.

Dampers 65, 66, and 67 are operated by synchronized pneumatic motors 70, 71, and 72 which are controlled by a remote zone thermostat 73. Damper 66 in the hot air duct is normally open. Damper 65 in the return air duct is normally closed. Damper 67 in the mixing chamber 60 is normally closed to the cold air inlet 69. On demand for cooling by the zone thermostat 73, the damper motor 71 will close the hot air duct 62 and the damper motor 70 will open the return air duct 61. On demand for further cooling, the damper motor 72 will rotate to close the hot air inlet 68 and open the cold air inlet 69. On demand for heat, the dampers will be operated in reverse order.

OPERATION

The system is designed to operate in connection with the circulation of hot and cold air in separate lines or ducts to the vicinity of rooms or areas being heated or cooled. A combined heating and cooling system is necessary in many large buildings, and particularly in areas having moderate temperatures, since there are many times where a building may have to be heated in one area and cooled in another. Also, in temperate areas, the need for heating and cooling may vary from day to day, or even hour to hour. In this system, separate ducts supply hot and cold air which is distributed through a multiplicity of fan-powered mixing boxes which blend the hot or cold supply air with ambient return air to provide room supply air at temperatures which may be graduated from hot to cold in a continuous manner.

The thermostat 29, accumulator 58, and damper motors 27 and 28 are calibrated so that a room temperature of 75 degrees F. is equivalent to 11 psig and from 10 to 12 psig neither damper motor is operational so only return air is being circulated. The hot air and cold air inlets are closed and only return air at ambient temperature is being circulated. On demand for cooling, equivalent to 12 psig, the cold air damper motor 53 begins to open the cold air inlet 40 and close the return air inlet 41 until at 17 psig the return air inlet 41 is completely closed, and the cold air inlet 40 is completely open. On demand for heating, equivalent to 10 psig, the hot air damper 52 begins to open the hot air inlet 39 and close the return air inlet 41 until the pressure drops to 5 psig at which the hot air inlet 39 is completely open and the return air inlet 41 is completely closed or until room thermostat 29 is satisfied.

The triple-inlet, fan-powered, mixing box 25 thus supplies all return air, graduated mixtures of return air and cold air, graduated mixtures of return air and hot air, or all cold air or hot air at a constant volume determined by the fan capacity to the zone being conditioned. The cold air and the hot air are never mixed directly. Several fan-powered mixing boxes may be incorporated to create a multizone system with each zone regulated by a thermostat to mix the return air with hot or cold air to supply the desired zone temperature.

Optionally, some central air handling units may be provided with a variable frequency controller 24 between the static pressure sensor 23 and the blower 11. The static pressure sensor 23 in the primary cooling duct 16 regulates the air pressure from blower 11. The variable frequency controller 24 proportionally reduces the speed of fan 11 in air handling unit 10 from either excessive pressure at static pressure sensor 23 or from excessive fan motor load sensed by the variable frequency controller 24. This feature allows the use of pressure dependent controls systems at significantly reduced initial cost and operating cost plus improved reliability from greater control system simplicity.

The system and the fan-powered mixing box have been described with special emphasis on a pneumatic control system. It should be understood, however, that equivalent hydraulic, electrical, thermoelectric, or thermal controls could be used. The damper motors 27 and 28 could be hydraulic, electric, thermoelectric or thermal motors. The dampers could also be operated by thermostatic motors energized electrically, or could be individually controlled thermostatically.

While this invention has been described fully and completely with special emphasis upon certain preferred embodiments, it should be understood that within the scope of the appended claims the invention may be practiced otherwise than as specifically described herein.

I claim:

1. An air conditioning system comprising
   a blower for supplying air to an air-conditioned zone,
   at least two air ducts extending from said blower to said zone,
   heating means in one of said ducts,
   cooling means in the other of said ducts,
   a passageway for conducting ambient return air from said zone to said blower,
   mixing means for mixing air supplied to said zone including a housing having a hot air inlet from said one duct, a cold air inlet from said other duct, a return air inlet from said passageway, an air mixing chamber, and an outlet to said zone,
   a fan positioned within said housing for inducing air through said inlets and discharging the air from said outlet,
   damper means positioned to control said hot air inlet,
   damper means positioned to control said cold air inlet, and
   means for actuating said damper means in synchronization in response to zone temperature to control the temperature of the air mixture discharged from said mixing means to said zone.

2. An air conditioning system according to claim 1 including;
   a static pressure sensor in said cold air duct coupled to said blower for sensing the air pressure within said cold air duct,
   a variable frequency controller operatively connected between said static pressure sensor and said blower for sensing the load of the blower motor,
   said variable frequency controller operatively connected to proportionally reduce the speed of said blower either upon excessive air pressure sensed by said static pressure sensor or upon excessive loading of the blower motor.

3. An air conditioning system according to claim 1 in which
   said return air inlet comprises a return air duct opening into said hot air duct outside said housing whereby a portion of said hot air duct also serves as the return air inlet in said housing through which either hot air or return air may be inducted by said fan into said mixing chamber,
   said mixing means comprises a mixing box for mixing air supplied to said zone, including
   first damper means positioned within said housing and controlling said hot air inlet and cold air inlet,
   second damper means positioned at the inlet from said return air duct and alternatively controlling the flow of return air or hot air through said hot air duct to said housing, and
   means for rotating said first and second damper means in synchronization in response to zone temperature to control the temperature of the air mixture discharged from said mixing box to said zone.

4. An air conditioning system according to claim 3 in which
   said damper means are synchronized in movement so that both the hot air and cold air ducts are not opened at the same time 5. An air conditioning system according to claim 4 in which
   said first damper means is movable between one position closing the hot air inlet and another position closing the cold air inlet, and
   said second damper means comprises separate damper members controlling alternatively the flow of hot air and return air through said hot air duct into said housing.

6. An air conditioning system according to claim 5 including
   separate actuators for each of said separate damper members.

7. An air conditioning system according to claim 6 in which
   said separate actuators are movable between positions closing said hot air inlet and opening said return air inlet to supply return air to mix with cold air and to positions mixing hot air and return air when said cold air controlling damper is closed so that hot air and cold air are never mixed.

8. An air conditioning system according to claim 1 including
   damper means to control said return air inlet.

9. An air conditioning system according to claim 8 in which
   said mixing means comprises a mixing box for mixing air supplied to said zone, and
   a first damper member positioned within said housing and controlling said hot air inlet and return air inlet,
   a second damper member positioned within said housing and controlling said cold air inlet and return air inlet, and
   means for rotating said first and second damper members sequentially and in synchronization in response to zone temperature to control the temperature of the air mixture discharged from said mixing box to said zone.

10. An air conditioning system according to claim 9 in which
    said dampers are synchronized in movement so that both the hot air and cold air ducts are not opened at the same time.

11. An air conditioning system according to claim 9 in which
    said first damper member is movable between one position closing the hot air inlet and opening the return air inlet and another position opening the hot air inlet and closing the return air inlet.

12. An air conditioning system according to claim 9 in which
    said second damper member is movable between one position closing the cold air inlet and opening the return air inlet and another position opening the cold air inlet and closing the return air inlet.

13. An air conditioning system according to claim 9 in which
    said first damper member is movable between one position closing the hot air inlet and opening the return air inlet and another position opening the hot air inlet and closing the return air inlet, and
    said second damper member is movable between one position closing the cold air inlet and opening the return air inlet and another position opening the cold air inlet and closing the return air inlet.

14. An air conditioning system according to claim 9 in which
at least one of said damper members comprises
a pair of flat damper members connected in a dihedral angle and having supporting means mounting the same for rotary movement in said housing.

15. An air conditioning system according to claim 14 in which
said flat damper members are connected in a 90 degree dihedral angle.

16. An air conditioning system according to claim 9 in which
said damper rotating means comprises motor means responsive to changes in temperature in said zone.

17. An air conditioning system according to claim 9 in which
said damper rotating means includes thermostatic means responsive to temperature in said zone.

18. An air conditioning system according to claim 9 in which
said damper rotating means comprises motor means, and
thermostatic means responsive to temperature in said zone operable to actuate said motor means.

19. An air conditioning system according to claim 9 in which
said motor means comprises at least one pneumatic motor, and
said thermostatic means comprises a zone thermostat and a pneumatic system controlled thereby for operation in response to selected temperature ranges.

20. An air conditioning system according to claim 19 including
a pneumatic accumulator adapted to actuate said damper rotating motors in response to preselected static pressure ranges.

21. A method of conditioning air in one or more zones comprising the steps of
providing separate sources of hot air, cold air, and return air,
providing a blower for said sources of hot air and cold air,
providing a fan-powered mixing box for a zone to be conditioned,
said mixing box having a hot air inlet, cold air inlet and return air inlet in close juxtaposition, damper means positioned to control said hot air inlet and said return air inlet, damper means positioned to control said cold air inlet and said return air inlet, and
connecting the fan-powered mixing box inlets to said separate sources of hot air and cold air, and return air,
thermostatically controlling said first named and said second named damper means in synchronization according to the demands of the zone being conditioned, to control the relative amounts of hot air, cold air, and return air introduced into said mixing box, and
discharging thermally conditioned air into the zone being conditioned, ranging from hot air, through mixtures of hot air and return air, return air, mixtures of return air and cold air, to cold air, without directly mixing hot and cold air together.

22. A method of conditioning air in one or more zones according to claim 21 including the steps of
installing a static pressure sensor in said cold air source, and
connecting a variable frequency controller between said static pressure sensor and the blower of said air heating and cooling means blower of said air heating and cooling means to sense the load on said blower and proportionally reduce the speed of said blower either upon excessive air pressure sensed by said static pressure sensor or upon excessive loading of the blower.

23. A fan-powered mixing apparatus for use in air conditioning systems comprising
mixing means comprising a mixing box for mixing air supplied to said zone including a housing having a hot air inlet from said one duct, a cold air inlet from said other duct, a return air inlet from said passageway, an air mixing chamber, and an outlet to said zone, including
a fan positioned within said housing for inducting air through said inlets and discharging the air from said outlet,
a first damper member positioned within said housing and controlling said hot air inlet and return air inlet,
a second damper member positioned within said housing and controlling said cold air inlet and return air inlet, and
means for rotating said first and second damper members sequentially and in synchronization in response to zone temperature to control the temperature of the air mixture discharged from said mixing box to said zone.

24. A fan-powered mixing apparatus according to claim 23 in which
said damper members are synchronized in movement so that both the hot air and cold air ducts ar not opened at the same time.

25. A fan-powered mixing apparatus according to claim 23 in which
said first damper member is movable between one position closing the hot air inlet and opening the return air inlet and another position opening the hot air inlet and closing the return air inlet 26. A fan-powered mixing apparatus according to claim 23 in which
said second damper member is movable between one position closing the cold air inlet and opening the return air inlet and another position opening the cold air inlet and closing the return air inlet 27. A fan-powered mixing apparatus according to claim 23 in which
said first damper member is movable between one position closing the hot air inlet and opening the return air inlet an another position opening the hot air inlet and closing the return air inlet, and
said second damper member is movable between one position closing the cold air inlet and opening the return air inlet and another position opening the cold air inlet and closing the return air inlet.

28. A fan-powered mixing apparatus according to claim 23 in which
at least one of said damper members comprises
a pair of flat damper members connected in a dihedral angle and having supporting means mounting the same for rotary movement in said housing 29. A fan-powered mixing apparatus according to claim 28 in which said flat damper members are connected in a 90 degree dihedral angle.

30. A fan-powered mixing apparatus according to claim 23 in which said damper rotating means comprises motor means adapted for response to changes in temperature in said zone.

31. A fan-powered mixing apparatus according to claim 23 in which said motor means comprises at least one pneumatic motor adapted for operation by a zone thermostat and a pneumatic system controlled thereby for operation in response to selected temperature ranges.

* * * * *